US006644712B1

United States Patent
Rafi-Zadeh

(10) Patent No.: US 6,644,712 B1
(45) Date of Patent: Nov. 11, 2003

(54) DISASSEMBLABLE ORTHOGONAL MULTILEVEL STORAGE ASSEMBLY CONFIGURABLE INTO VARIABLE SIZED STORAGE CHAMBERS FOR VEHICLE PASSENGER COMPARTMENTS AND PICKUP TRUCK BEDS

(76) Inventor: Hassan Rafi-Zadeh, 5301 Mockingbird La., Paradise Valley, AZ (US) 85253

( * ) Notice: Subject to any disclaimer, the term of this patent is extended or adjusted under 35 U.S.C. 154(b) by 0 days.

(21) Appl. No.: 10/200,476

(22) Filed: Jul. 18, 2002

(51) Int. Cl.[7] ............................. B60R 7/00; B60R 5/04
(52) U.S. Cl. .................. 296/37.8; 296/37.6; 296/37.16
(58) Field of Search ..................... 296/37.8, 37.6, 296/37.16; 224/275, 484, 485, 539, 542; 220/23.2, 23.4, 23.83, 23.86, 500, 529, 530, 534, 551, 552, 553

(56) References Cited

U.S. PATENT DOCUMENTS

| | | | | |
|---|---|---|---|---|
| 1,259,320 A | * | 3/1918 | Tyler | |
| 2,942,749 A | * | 6/1960 | Rosenberg | |
| 4,917,429 A | * | 4/1990 | Giger | 296/37.6 |
| 4,986,590 A | * | 1/1991 | Patti et al. | 296/39.2 |
| 5,052,580 A | * | 10/1991 | Khoury | 220/533 |
| 5,054,668 A | * | 10/1991 | Ricchiuti | 296/37.1 |
| 5,083,828 A | * | 1/1992 | Accettura | 296/37.6 |
| 5,133,489 A | * | 7/1992 | Loew et al. | 224/529 |
| 5,139,186 A | * | 8/1992 | Loew et al. | 220/529 |
| 5,215,205 A | * | 6/1993 | Behlman | 220/533 |
| 5,597,193 A | * | 1/1997 | Conner | 296/37.6 |
| 5,772,058 A | * | 6/1998 | Staesche | 224/542 |
| 6,478,356 B1 | * | 11/2002 | Wayne | 296/39.2 |

FOREIGN PATENT DOCUMENTS

WO 9117066 * 11/1991 ................ 296/39.2

* cited by examiner

Primary Examiner—Joseph D. Pape
Assistant Examiner—H. Gutman
(74) Attorney, Agent, or Firm—Tod R. Nissle, P.C.

(57) ABSTRACT

A disassemblable orthogonal multilevel storage assembly is configurable into variable sized storage chambers for installation in vehicle passenger compartments and pickup truck beds. The assembly uses a plurality of telescoping panels each having a plurality of apertures spaced apart at equal intervals along designated lines in the panels such that the panels can be interconnected when positioned in horizontal and vertical orientations adjacent one another. Tabs are formed along selected edges of the panels and include a plurality of apertures spaced apart at equal intervals to facilitate interconnection of panels. The storage assembly can be configured to be installed in a passenger compartment when seats are removed from the passenger compartment.

5 Claims, 8 Drawing Sheets

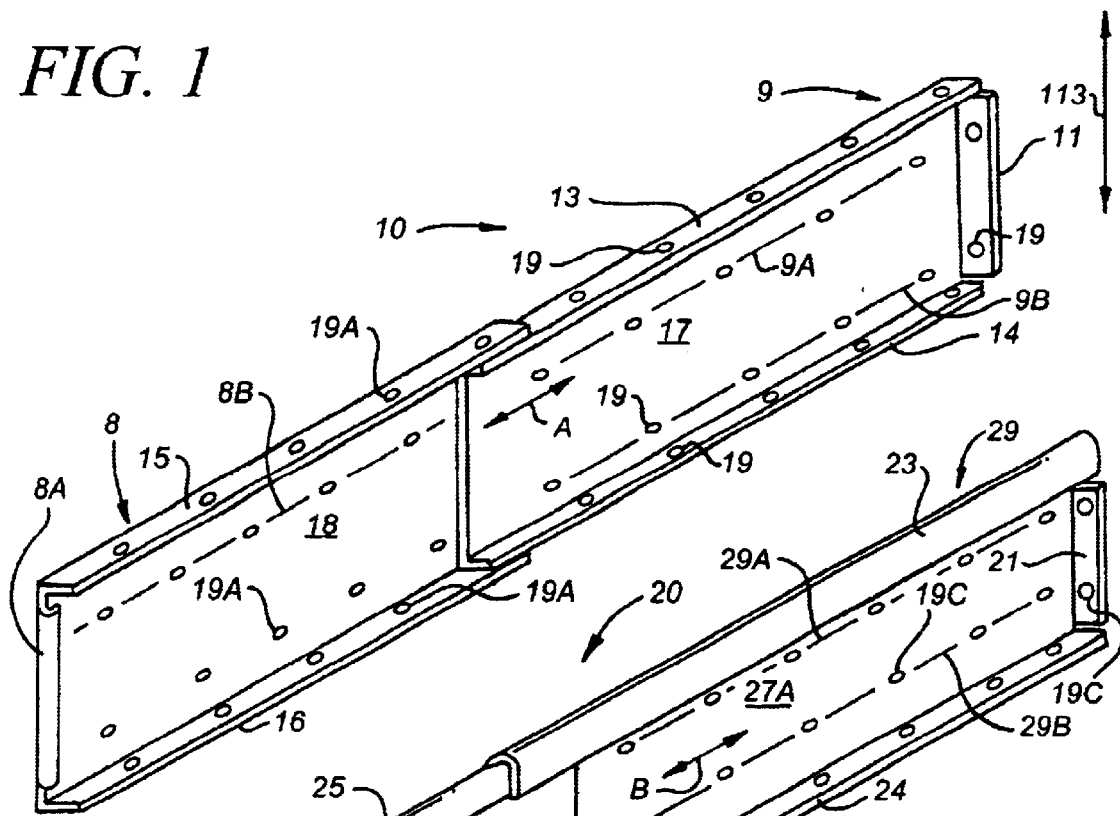
FIG. 1
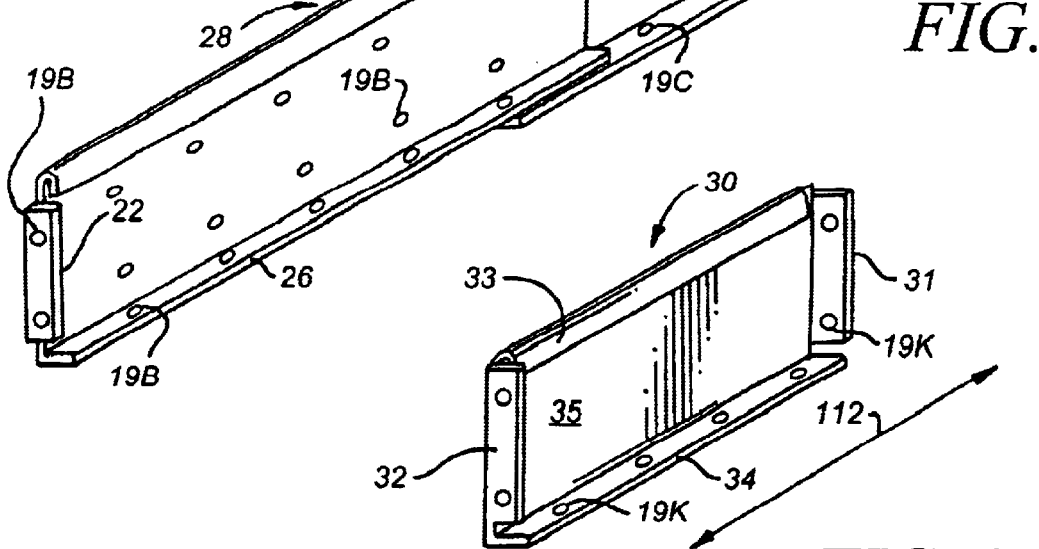
FIG. 2
FIG. 3

DISASSEMBLABLE ORTHOGONAL MULTILEVEL STORAGE ASSEMBLY CONFIGURABLE INTO VARIABLE SIZED STORAGE CHAMBERS FOR VEHICLE PASSENGER COMPARTMENTS AND PICKUP TRUCK BEDS

BACKGROUND OF THE INVENTION

1. Field of the Invention

This invention relates to storage systems.

More particularly, the invention relates to storage systems for vehicle passenger compartments and for pickup truck beds.

In a further respect, the invention relates to storage systems that can be disassembled and that can be assembled to occupy different sized spaces in vehicles.

In another respect, the invention relates to multi-story storage systems.

In still a further respect, the invention relates to storage systems that can be configured to extend along side a seat in the passenger compartment of a vehicle.

In yet another respect, the invention relates to a storage system that utilizes telescoping assembly components perforated at equivalent spaces to facilitate vertical and horizontal fastening of the components to one another and to other non-perforated components.

In still yet another respect, the invention relates to a storage system that utilizes perforated corner tabs to secure the upper level of a multi-level storage system.

2. Description of the Art

Storage systems for the beds of pickup trucks are known. See for example, my U.S. Pat. No. 4,469,364. Such pre-existing storage systems were not, however, readily configured to fit different sized pickup truck beds and, importantly, were not intended to be used in the passenger compartments of pickup trucks, SUVs, and vans.

Accordingly, it would be highly desirable to provide storage systems that could be readily adapted to be used in different sized vehicles.

Therefore, it is a principal object of the instant invention to provide an improved storage apparatus.

Another object of the invention is to provide an improved construction kit that can be utilized to assemble multi-story storage units including storage compartments of varying sizes and shapes.

A further object of the invention is to provide an improved storage apparatus that can be configured to fit different sized vehicle passenger compartments that either have their normal complement of seats or that have had one or more seats removed.

BRIEF DESCRIPTION OF THE SEVERAL VIEWS OF THE DRAWINGS

These and other, further and more specific objects and advantages of the invention will be apparent to those skilled in the art from the following detailed description thereof, taken in conjunction with the drawings, in which:

FIG. 1 is a perspective view illustrating a telescoping structural component utilized in constructing multi-story storage units in accordance with the invention;

FIG. 2 is a perspective view illustrating an alternate telescoping structural component utilized in the invention;

FIG. 3 is a perspective view illustrating another panel structural component utilized in the invention;

BRIEF SUMMARY OF THE INVENTION

Figure 4:
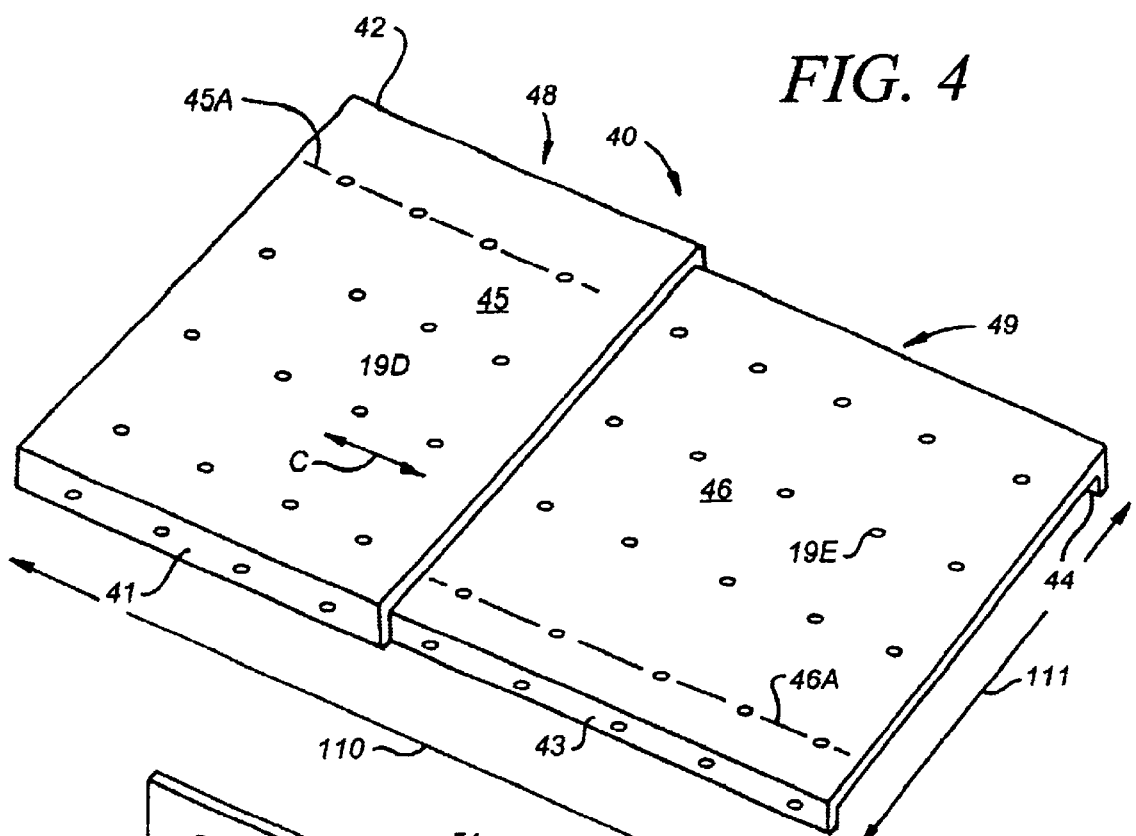
FIG. 4 is a perspective view illustrating still another telescoping panel structural component of the invention.

Briefly, in accordance with the invention, an improved kit for assembling a multi-level storage unit in multiple configurations for a vehicle compartment is shown. The kit includes a lower floor member; an upper floor member; a plurality of telescoping divider panels insertable intermediate the lower and upper floor members in spaced apart relationship and including a plurality of equally spaced apertures formed therethrough; a plurality of fasteners insertable through the apertures to secure the divider panels to the upper and lower floor members; a plurality of telescoping spacer panels mountable on the upper floor member in spaced apart relationship and each having a front end and a back end; and, a plurality of telescoping containment panels mounted on the upper floor member in spaced apart relationship, at least one of the containment panels being mounted at the front ends of at least a pair of the spacer panels and at least another of the containment panels being mounted at the back ends of at least a pair of the spacer panels.

In another embodiment of the invention, an improved method is provided for installing a multi-story storage compartment in the passenger compartment of a vehicle, said passenger compartment including at least first and second seats. The improved method includes the steps of removing at least the first seat from the passenger compartment; and, installing the multi-story storage compartment in the passenger compartment such that at least a portion of the storage compartment extends into the area occupied by the first seat prior to removal of the first seat from the passenger compartment.

In a further embodiment of the invention, an improved multi-level storage unit is provided in multiple configurations for a vehicle compartment. The unit includes a lower floor member; an upper floor member; a plurality of telescoping divider panels intermediate the lower and upper floor members in spaced apart relationship and including a plurality of equally spaced apertures formed therethrough; a plurality of fasteners each inserted through one of the apertures into one of the upper and lower floor members to secure said divider panels to the upper and lower floor members; a plurality of telescoping spacer panels mounted on the upper floor member in spaced apart relationship and each having a front end and a back end and including a plurality of equally spaced apertures formed therethrough; a plurality of fasteners each inserted through one of the apertures in the spacer panels into the upper floor member to secure the spaced panels to the upper floor member; a plurality of telescoping containment panels mounted on the upper floor member in spaced apart relationship, at least one of the containment panels being mounted at said front ends of at least a pair of the spacer panels and at least another of the containment panels being mounted at the back ends of at least a pair of the spacer panels, each of the containment panels including a plurality of equally spaced apertures formed therethrough; and, a plurality of fasteners each inserted through one of the apertures in the containment panels into the upper floor member to secure the spacer panels to the upper floor member.

In still another embodiment of the invention, a method is provided for constructing a multi-story storage unit. The method includes the steps of providing a lower floor member; providing an upper floor member; mounting a plurality of telescoping divider panels intermediate the lower and upper floor members in spaced apart relationship; mounting at least first and second telescoping spacer panels on the upper floor member in spaced apart relationship, each panel having a front end with a tab, and a back end with a tab; mounting a first telescoping containment panel on the upper floor member, the containment panel including a first end with a tab and a second end with a tab, the first end being adjacent the front end of the first spacer panel, the second end being adjacent the front end of the second spacer panel; and, mounting a second telescoping containment panel on the upper floor member, the second containment panel including a primary end with a tab and a secondary end with a tab, the primary end being adjacent the back end of the first spacer panel, the secondary end being adjacent the back end of the second spacer panel.

DETAILED DESCRIPTION OF THE INVENTION

Turning now to the drawings, which illustrate the presently preferred embodiments of the invention for the purpose of illustrating the practice thereof and not by way of limitation of the scope of the invention, and in which like reference characters refer to corresponding elements throughout the several views, FIG. 1 illustrates a telescoping divider panel member 10 including telescoping sections 8 and 9.

Section 8 includes panel 18 and tabs 15 and 16 normal to panel 18. The leading edge 8A of panel 8 can be rolled over in the manner illustrated in FIG. 1 or can simply be a flat edge like edge 51A in FIG. 5. A plurality of apertures 19A are formed in section 8. Groups of apertures 19A are equally spaced along aperture lines in section 8. For example, the apertures 19A lying along aperture line 8B are equally spaced, as are the apertures 19A lying along tab 15 and the apertures 19A lying along tab 16.

Section 9 includes panel 17 and tabs 13 and 14 normal to panel 17. Tab 11 extends from and is normal to panel 17. A plurality of apertures 19 are formed in panel 17. Groups of apertures 19 are equally spaced along aperture lines in section 9. For example, the apertures 19 lying along aperture line 9A are equally spaced, as are the apertures 19 lying along tab 13, the apertures 19 lying along tab 14, and the apertures lying along aperture line 9B. The apertures in tab 11 are spaced apart a distance equal to the distance between lines 9A and 9B.

FIG. 2 illustrates a telescoping spacer panel member 20 including telescoping sections 28 and 29.

Figure 5:
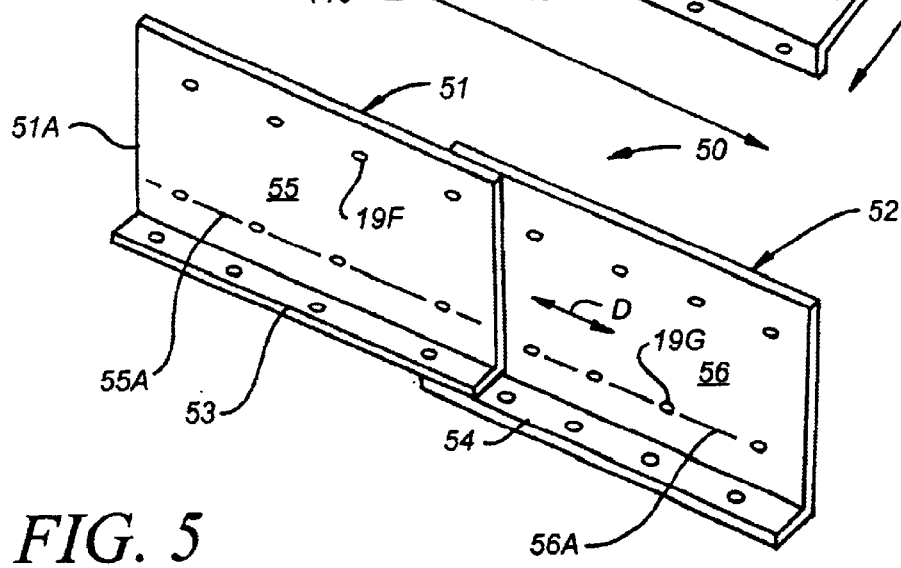
FIG. 5 is a perspective view illustrating yet another telescoping panel structural component used in the practice of the invention.

Section 28 includes panel 27, tab 26 normal to panel 27, bent or turned over upper edge 25, and tab 22 normal to panel 27. If desired, upper edge 25 can not be turned over on itself and can instead be flat like the upper edge of section 51 (FIG. 5). Groups of apertures 19B are equally spaced along aperture lines in section 28. For example, the apertures 19B lying along lines parallel to tab 26 are equally spaced, as are the apertures 19B lying along tab 26. The apertures 19B in tab 22 are spaced apart a distance equal to the afore-mentioned aperture lines in panel 27 that are parallel to tab 26.

Section 29 includes upper edge 23, panel 27A, tab 24 normal to panel 27A, and tab 21 normal to panel 27A. A plurality of apertures 19C are formed in panel 27A. Groups of apertures 19C are equally spaced along aperture lines 29A and 29B in section 27A parallel to tab 24 and are also equally spaced along tab 24. The apertures 19C in tab 21 are spaced apart a distance equal to the distance between aperture lines 29A and 29B.

FIG. 3 illustrates a fixed-length panel member 30 including tabs 31, 32, 34 normal to panel 35. Apertures 19K are formed through tabs 31, 32, 34. Apertures 19K along tab 34 are equally spaced. The distance between each adjacent pair of apertures 19K in tab 34 is preferably equal to the distance between each adjacent pair of apertures 19A lying along an aperture line 8B in panel 18, each adjacent pair of apertures 9A lying along an aperture line 9A or 9B in panel 17, each adjacent pair of apertures 19B lying along an aperture line parallel to tab 26 in panel 27, and each adjacent pair of apertures 19C lying along an aperture line 29A or 29B in panel 27A.

FIG. 4 illustrates a telescoping floor panel member 40 including telescoping sections 48 and 49.

Section 48 includes panel 45 and tabs 41 and 42 normal to panel 45. A plurality of apertures 19D are-formed in section 48. Groups of apertures 19D are equally spaced along aperture lines in section 28. For example, the apertures 19D lying along aperture lines 45A in panel 45 that are parallel to tabs 41 and 42 are equally spaced, as are the apertures 19D lying along each tab 41, 42. Each adjacent pair of apertures 19D in tabs 41 and 42 and along aperture lines 45A is spaced apart a distance equal to the distance between each adjacent pair of apertures 19A in aperture line 8B.

Section 49 includes panel 46 and tabs 43 and 44 normal to panel 46. A plurality of apertures 19E are formed in section 49. Groups of apertures 19E are equally spaced along aperture lines 46A in section 49 and are spaced along tabs 43 and 44. The aperture 19E along aperture lines 46A are spaced apart a distance equal to the distance between apertures 19 in lines 9A and 9B and apertures 19C in apertures lines 29A and 29B.

FIG. 5 illustrates a telescoping retention panel member 50 including telescoping sections 51 and 52.

Section 51 includes panel 55 and tab 53 normal to panel 55. A plurality of apertures 19F are formed in section 51. Groups of apertures 19F are equally spaced along aperture lines 55A in panel 51. For example, the apertures 19F lying along aperture lines 55A in panel 55 that are parallel to tab 53 are equally spaced, as are the apertures 19F lying along tab 53. Each adjacent pair of apertures 53A in tab 53 and along aperture lines 55A is spaced apart a distance equal to the distance between each adjacent pair of apertures 19A in aperture line 8B and between each adjacent pair of apertures 19 in aperture line 9A.

Section 52 includes panel 56 and tab 54 normal to panel 46. A plurality of apertures 19G are formed in section 52. Groups of apertures 19G are equally spaced along aperture lines 56A in panel 56 and are equally spaced along tab 54. Each adjacent pair of apertures 19G along aperture lines 56A and along tab 54 is spaced apart a distance equal to the distance between each adjacent pair of apertures 19 in lines 9A and 9B and apertures 19C in aperture lines 29A and 29B.

Figure 6:
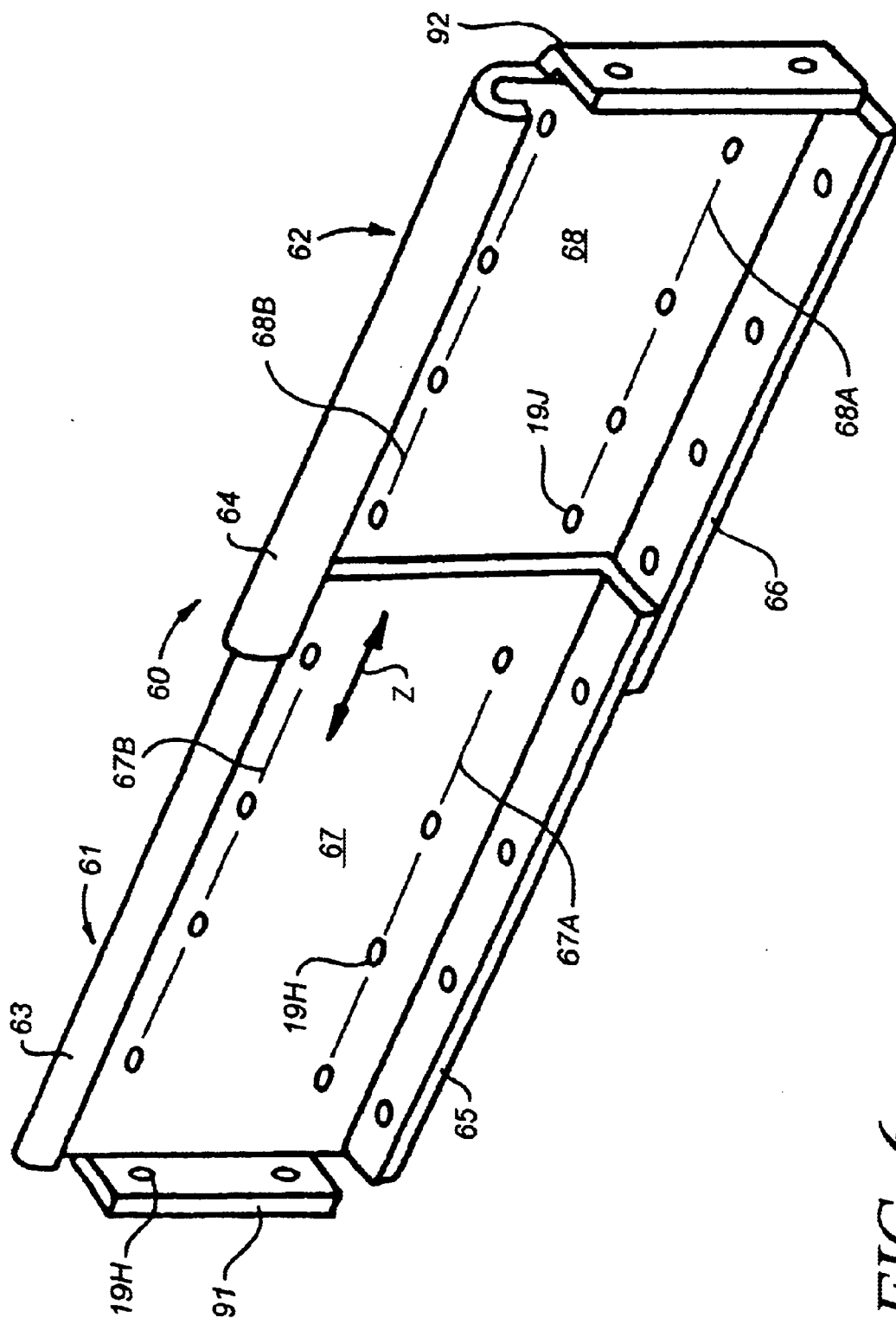
FIG. 6 is a perspective view illustrating still a further telescoping panel structural component utilized in the invention.

FIG. 6 illustrates a telescoping containment panel member 60 including telescoping sections 61 and 62.

Section 61 includes panel 67, tab 91 normal to panel 67, bent or turned over upper edge 63, and tab 65 normal to panel 67. If desired, upper edge 63 can be flat and not be turned over on itself. A plurality of apertures 19H are formed in section 61. Groups of apertures 19H are equally spaced along aperture lines 67A and 67B in panel 67, and are equally spaced along tab 65. Each adjacent pair of apertures 19H in tab 65 and along lines 67A and 67B are spaced apart a distance equal to the distance each adjacent pair of apertures 19C are spaced apart along aperture lines 29A and 29B. The apertures 19H in tab 91 are spaced apart a distance equal to the distance between aperture lines 29A and 29B.

Section 62 includes panel 68, tab 92 normal to panel 68, and tab 66 normal to panel 68. A plurality of apertures 19J are formed in section 62. Groups of apertures 19J are equally spaced along aperture lines 68A and 68B in panel 68 parallel to tab 66 and are also equally spaced along tab 66. Each pair of adjacent apertures along aperture lines 68A and 68B and, along tab 66 are spaced apart a distance equal to the distance each adjacent pair of apertures 19C are spaced apart along aperture lines 29A and 29B. The apertures 19J in tab 92 are spaced apart a distance equal to the distance between aperture lines 68A and 68B.

Figure 7:
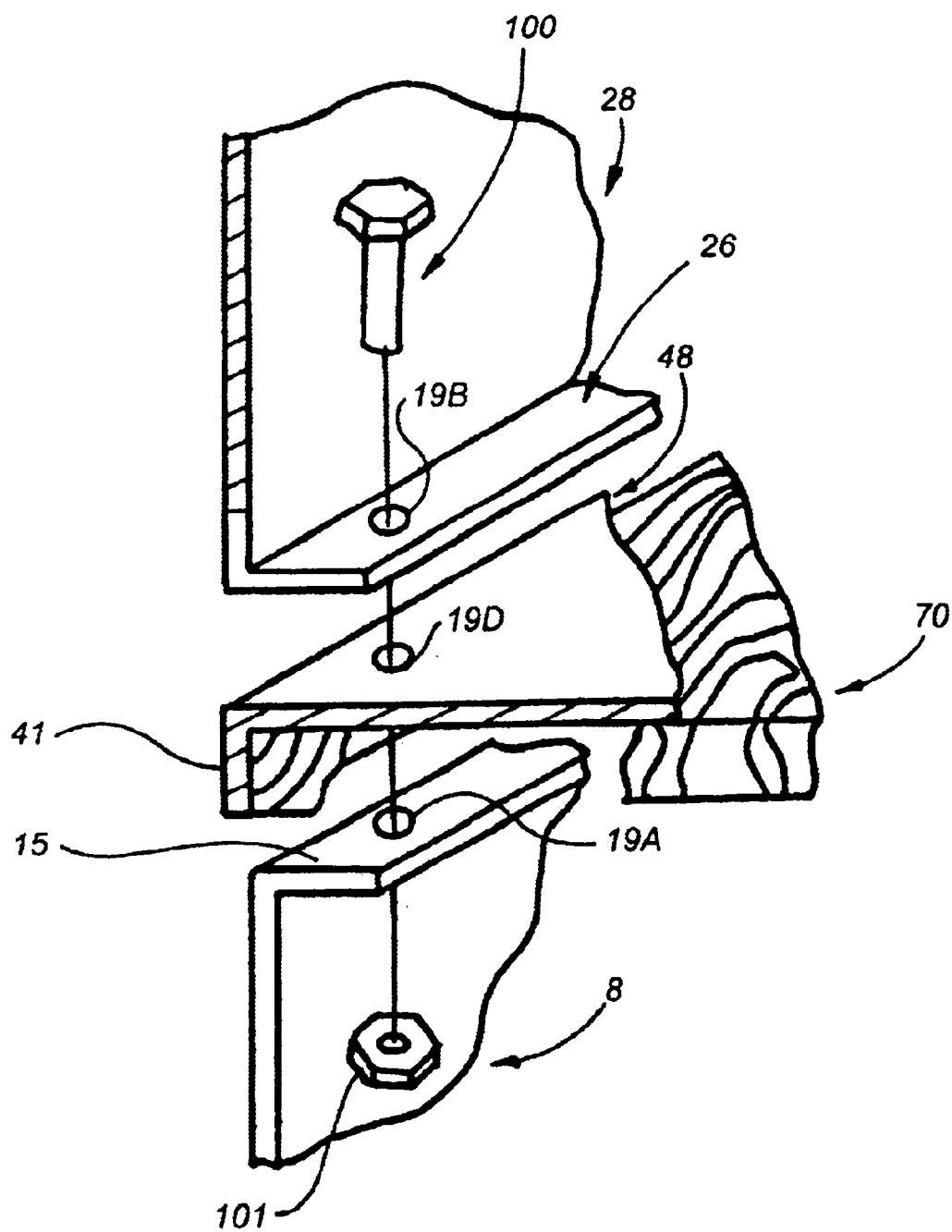
FIG. 7 is a perspective exploded view illustrating assembly of structural components of the invention.
Figure 11:
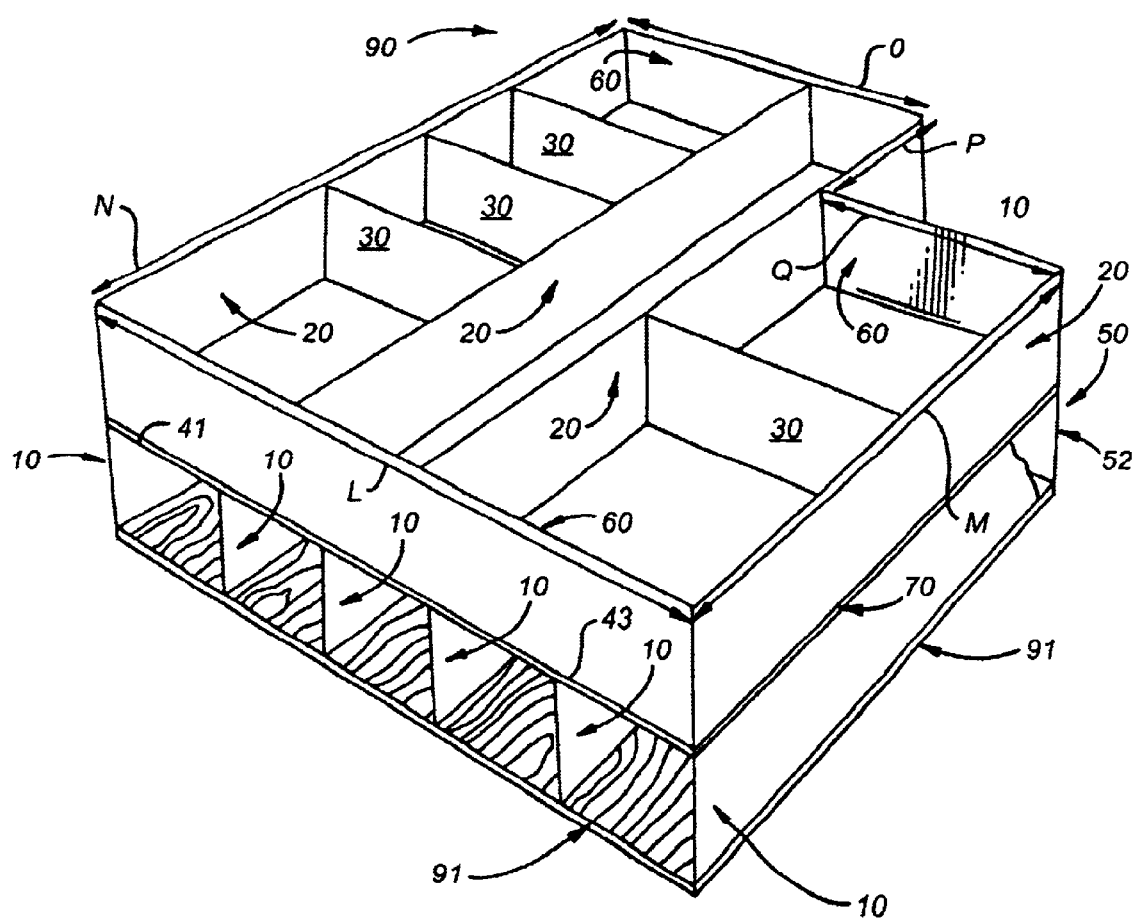
FIG. 11 is a perspective view illustrating a multi-story storage unit constructed utilizing the structural components of FIGS. 1 to 6; and, FIG. 12 is a perspective view illustrating the assembly of structural components utilized in the practice of the invention.

FIG. 7 illustrates the assembly of a divider panel member 10, an upper floor member 70 comprising a piece of plywood, an upper floor panel member 40, and a spacer panel member 20. Apertures 19B in tab 26 in section 28 of panel member 20 align with apertures 19D in section 48 of floor panel member 40, align with a hole (not visible) formed through the plywood, and align with apertures 19A in tab 15 of section 8 of divider panel member 10. A bolt 100 is inserted through each group of registered apertures 19B, 19D, and 19A to secure together a divider panel member 10, floor member 70, floor panel member 40, and spacer panel member 20. A nut 101 is threaded onto the bolt 100. Alternatively, a first wood screw can be turned through apertures 19B and 19D into member 70, and, a second wood screw can be turned through aperture 19A into member 70. Bolts, wood screws, or other desired fasteners are inserted through apertures 19A and 19 in tabs 16 and 14, respectively, to secure tabs 16 and 14 to a bottom wood floor member 91A (FIG. 11).

Figure 12:
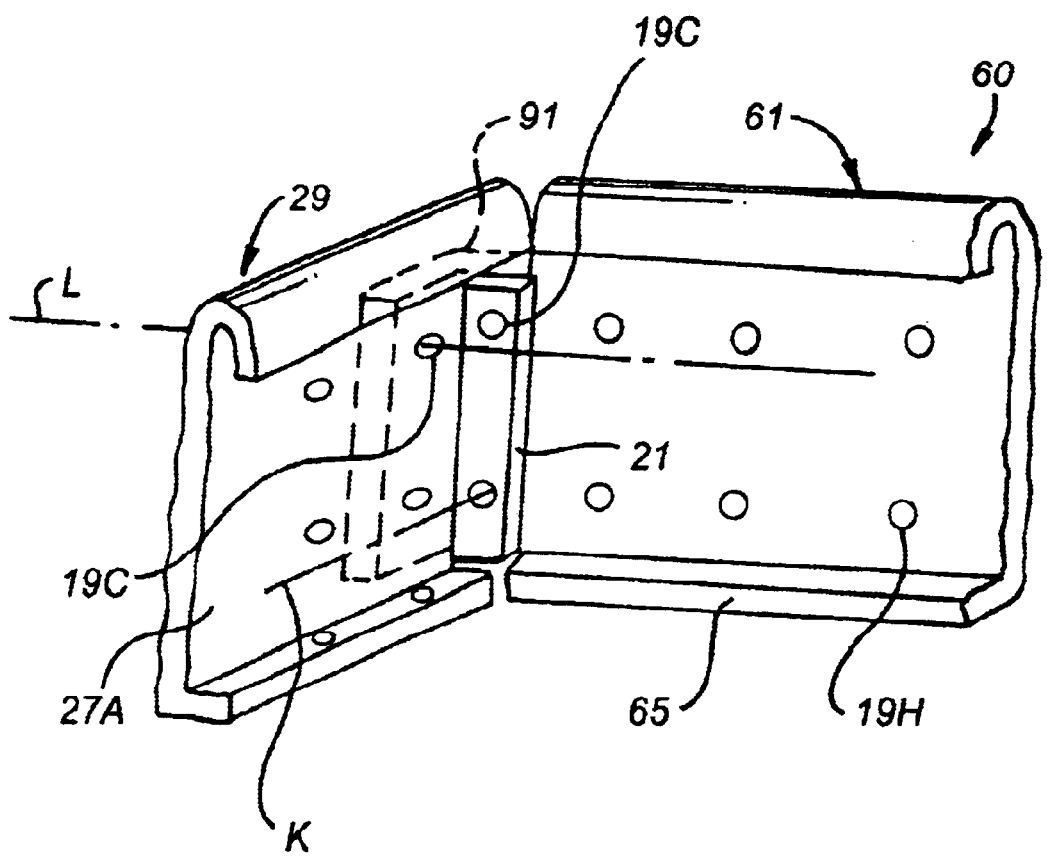

FIG. 12 illustrates the attachment of a containment member 60 to a spacer member 20. The tab 21 of a section 29 of a spacer member 20 is positioned against the inner face of a section 61 of a containment member 60. Apertures 19C in tab 21 are, as indicated by axis K, in alignment with apertures 19H in section 61 such that bolts/nut can be inserted through aligned aperture pairs 19C–19H to secure tab 21 to section 61. The tab 91 of section 61 extends around the outer surface of section 29 in the manner shown such that apertures 19H in tab 91 are, as indicated by axis L1, in alignment with apertures 19C in panel 27A of section 29. Bolts/nuts are inserted through such aligned aperture pairs to secure tab 91 to section 29. The overlapping-innerlapping tab arrangement illustrated in FIG. 12 strengthens the corners where spacer members 20 meet containment members 60.

Lower floor member 91 and upper floor member 70 can be made from any desired material. Wood, specifically plywood, is presently preferred because it facilitates construction and facilitates the sliding removal of tools or other equipment into and out of the storage unit of the invention.

Figure 8:
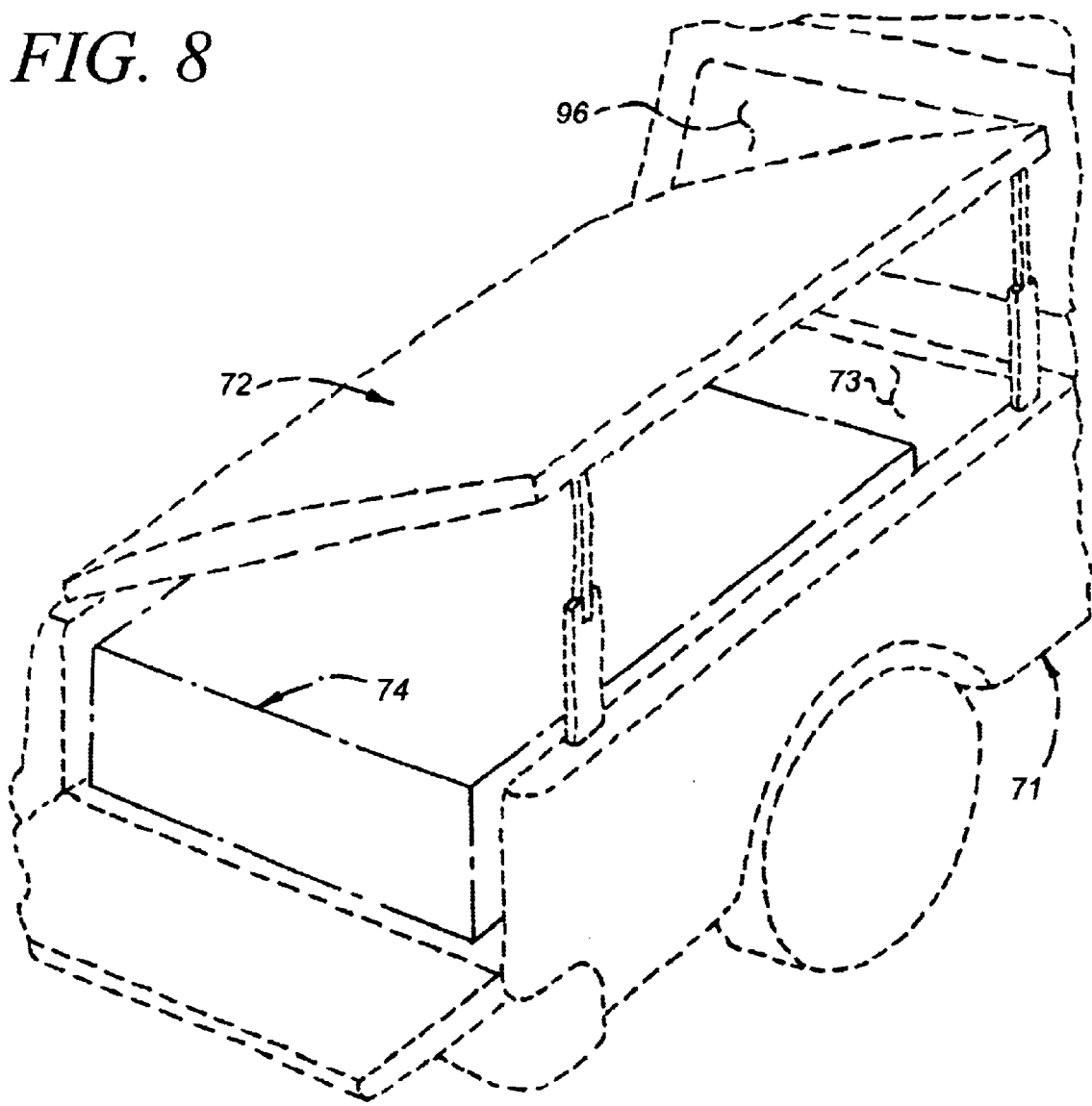
FIG. 8 is a perspective view illustrating a multi-story storage unit of the invention positioned in the bed of a pickup truck.

FIG. 8 illustrates a storage unit 74 mounted in the space 73 in the bed of a pickup truck 71. Truck 71 includes, in conventional fashion, a passenger compartment with a rear window 96. A cover 72 is mounted on the bed of truck 71. Cover 72 can be opened and closed. In FIG. 8, a first side of cover 72 is opened on one side of the truck bed. The other side of cover 72 can also be raised, or opened, in the manner that the first side is opened.

Figure 9:
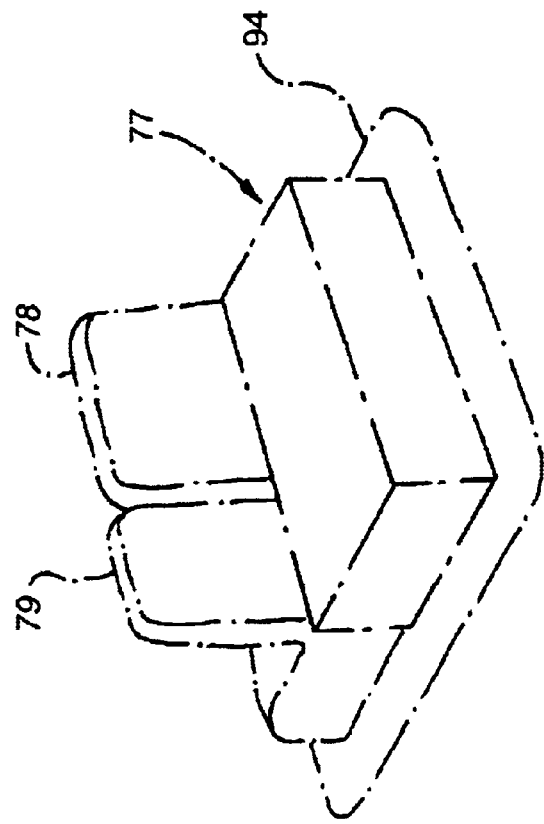
FIG. 9 is a perspective view illustrating a multi-story storage unit of the invention in the passenger compartment of a pickup truck.

As will be described, the storage unit of the invention can be assembled into a variety of orthogonal configurations. As shown in FIG. 9, one configuration 77 of the storage unit of the invention can be placed on the floor 94 in the back of the passenger compartment of a pickup truck behind front seats 78 and 79 when the back seat is removed. As used herein, the back seat is removed either by physically removing the back seat from the passenger compartment of the pickup truck or by folding the back seat down such that storage unit 77 can be placed in the back of the passenger compartment. In FIG. 9, unit 77 has only a single story. Unit 77 can be multi-story like the unit 90 illustrated in FIG. 11.

Figure 10:
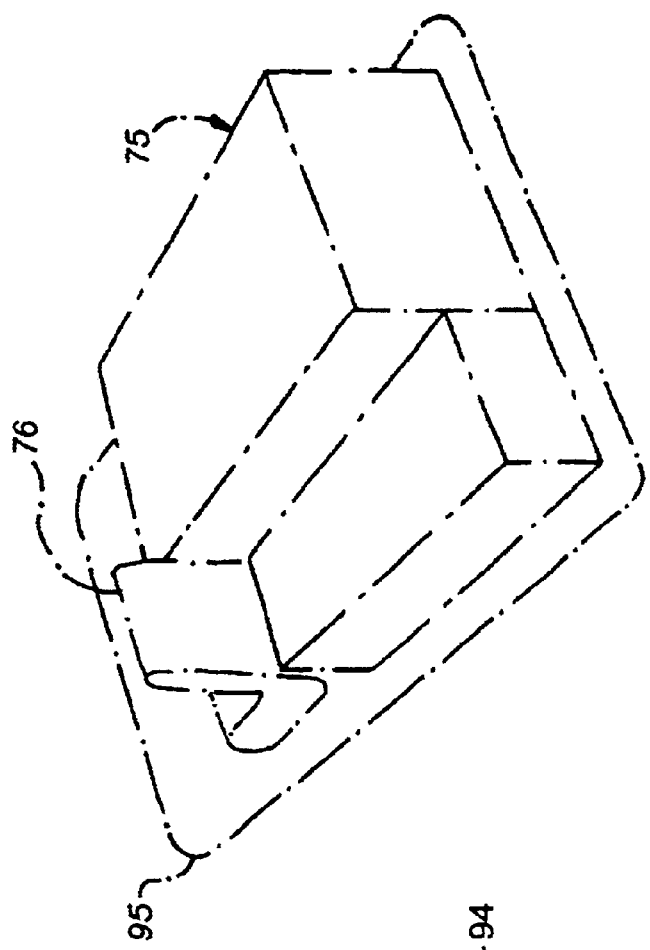
FIG. 10 is a perspective view illustrating a multi-story storage unit of the invention configured for the passenger compartment of a vehicle after a vehicle seat is removed.

Another multi-story configuration 75 of the storage unit of the invention can, as indicated in FIG. 10, be utilized on the floor 95 in the passenger compartment of a van, mini-van, or SUV. As used herein, the passenger compartment of a van, mini-van, or SUV includes the interior of the vehicle, including interior areas where each passenger seat is placed and including any auxiliary storage area inside the vehicle. One particular advantageous feature of the invention is that one or more seats of a van, mini-van, or SUV can be removed and the area that was occupied by the seat before it was removed can be occupied in whole or in part by a portion of a storage unit constructed in accordance with the invention. In FIG. 10, a portion of unit 75 extends along side front seat 76 into the area that was occupied by the other front seat before the other front seat was removed by folding the front seat down or by physically removing the front seat from the vehicle.

The components illustrated in FIGS. 1 to 6 can be fabricated from any desired material but presently preferably are fabricated from sheets of galvanized steel or other metals.

Since the majority of pickup trucks, vans, mini-vans, and SUVs on the market have known maximum storage areas, the telescoping panel members illustrated in FIGS. 1, 2, 4 to 6 are preferably pre-fabricated in known sizes. For example, the telescoping divider panel members 10 and spacer panel members 20 each have a length that can be slidably adjusted between twenty-eight inches and fifty-five inches by sliding the sections comprising the panel members in the directions indicated by arrows A and B, respectively. Similarly, each telescoping containment panel member 60 and retaining panel member 50 can be adjusted by sliding the sections comprising the panel members in the directions indicated by arrows D and Z, respectively, to lengths between twenty-seven inches and forty-eight inches. Each telescoping floor panel member 40 has a length than can be adjusted by sliding the sections 48, 49 in the directions indicated by arrows C.

In use, a pickup truck bed, passenger compartment, or other vehicle compartment to be occupied by a storage unit 90 is selected. A user may select the bed of a pickup truck as the vehicle compartment to be occupied by a unit 90, or, may select a portion of the interior of a van, mini-van, or SUV. Once the vehicle compartment or portion thereof is selected, the user determines the size of the selected compartment by measuring the length(s), height(s), and width(s) of the compartment. For this example, it is assumed that the user selects the bed of a pickup truck and elects to fill only the portion of the bed that has the outer dimensions of the storage unit 90 illustrated in FIG. 11.

The lower floor member 91A is prepared by cutting one or more pieces of plywood to form a floor member 91A having a generally L-shaped peripheral edge with the dimensions indicated by arrows L to Q.

An upper floor member 70 is prepared by cutting one or more pieces of plywood to form a floor member 70 also having a generally L-shaped peripheral edge with the dimensions indicated by arrows L to Q.

If desired, a metal telescoping floor member 40 can also be used in place of member 70 or in combination with member 70 in the manner illustrated in FIG. 7. If the member 40 is utilized, the length of member 40 is adjusted by sliding section(s) 48 and/or 49 in the directions indicated by arrow C until the length indicated by arrow 110 equals the length indicated by arrows L in FIG. 11. If the width, indicated by arrows 111, less than the width indicated by arrows M in FIG. 11, then additional members 40 can be utilized by, if necessary, cutting them to size, or, by using other members to complete an upper generally L-shaped metal floor having the peripheral dimensions indicated by arrows L to Q.

The number of divider panel members 10 desired is determined, along with the desired spacing between members 10. The six panel members 10 illustrated in FIG. 11 are selected. Three of members 10 have a length indicated by arrows N. The other three members 10 have a length indicated by arrows M. The sections comprising each member 10 are slidably adjusted until the length of three members 10 is the length indicated by arrows N and the length of the remaining three members 10 is the length indicated by arrows M. Wood screws (or bolts) are inserted through apertures 19A, 19 in tabs 13 to 16 to secure members 10 to floor members 70 and 91A in the manner and spacing illustrated in FIG. 11. In the configuration illustrated in FIG. 11, each adjacent pair of members 10 is equally spaced. The spacing between each pair of members 10 can vary as desired.

The number of spacer panel members 20 desired is determined, along with the desired spacing between members 20. The four members 20 illustrated in FIG. 11 are selected. Three of members 20 have a length indicated by arrows N. The remaining member 20 has a length indicated by arrows M. The sections comprising each member 20 are slidably adjusted until the length of three members 20 is the length indicated by arrows N and the length of the remaining member 20 is the length indicated by arrows M. Members 20 are secured to the upper floor member(s) 40 and 70 in the manner illustrated in FIG. 11 by inserting wood screws (or bolts) through apertures 19B and 19C in tabs 26 and 24 and, if appropriate, through apertures 19, 19A, 19D and apertures in member 70 that may be aligned with apertures 19B and 19C in the manner illustrated in FIG. 7.

Three containment panel members 60 are selected. As can be seen in FIG. 11, one member 60 has a length indicated by arrows L, another member 60 has a length indicated by arrows O, and the remaining member 60 has a length indicated by arrows Q. The sections of each member 60 are slidably adjusted in the manner indicated by arrows Z until one member 60 has a length L, another has a length O, and the remaining member 60 has the length Q. The containment members 60 are secured to the upper floor member(s) 40 and 70 in the manner illustrated in FIG. 11 by inserting wood screws (or bolts) through apertures 19H and 19J in tabs 65 and 66 and, if appropriate, through apertures 19, 19A, 19D and apertures in member 70 that may be aligned with apertures 19H and 19J. In addition, where one end of a member 70 meets an end of a member 20 in the manner illustrated in FIG. 12, metal screws or bolts are inserted through apertures 19C and 19H in the manner described with respect to FIG. 12 to secure together members 70 and 20.

The number and length of each fixed-length panel member 30 (FIG. 3) is determined. Panel members 30 having fixed lengths 112 are typically stocked, along with members 10, 20, 50, 50, 60 as part of the construction kit of the invention to facilitate the rapid assembly of a storage unit 90. Similarly, the height 113 (FIG. 1) of each member 10, 20, 30, 60 is normally identical and fixed at a selected value to facilitate the rapid assembly of a storage unit 90. Members 30 having fixed lengths of five inches, nine inches, eleven inches, thirteen inches, and eighteen inches are presently utilized. The height 113 is presently eight and one-half inches. It is understood that custom members 10, 20, 30, 40, 50, 60 of any desired shape and dimension, and that may or may not be slidably adjustable to alter the length of the member, can be fabricated in the practice of the invention. Since one important objective of the invention is to provide a construction kit that can be quickly assembled into a variety of storage units with different configurations that will fit a selected vehicle compartment, it is generally preferred that each component in the storage unit construction kit of the invention be pre-made and ready for assembly so that a variety of different sized and different shaped storage units can be quickly assembled with the members 10, 20, etc., fasteners, wood, and other desired parts at hand.

The location of each member 30 in unit 90 is selected and members 30 are positioned in the manner shown in FIG. 11. Metal screws or bolts are inserted through apertures 19K in tabs 31 and 32 and through apertures 19B or 19C aligned with apertures 19K. This secures each member 30 to members 20. Wood screws, metal screws, or bolts are inserted through apertures 19K in tab 34 and, if appropriate through apertures 19D or 19E. This secures each member 30 to member 40 and/or 70.

A pair of retention members 50 are selected. One member 50 is slidably adjusted to the length indicated by arrows O. The other member 50 is slidably adjusted to the length indicated by arrows Q. The member 50 with a length Q is placed at the position indicated in FIG. 11 beneath the member 60 have a length Q. Wood screws are turned through apertures 19F and 19G in tabs 53 and 54 into wood floor member 91A. Metal screws or bolts are inserted through apertures 19F and 19G in panels 55 and 56 and into apertures 19 in tabs 11 to secure member 50 to members 10. The member 50 with a length O is similarly installed directly beneath the member 60 with a length O.

Having described my invention in such terms as to enable those of skill in the art to understand and practice it, and having described the presently preferred embodiments and best mode thereof, I claim:

1. A kit for assembling a multi-level storage unit in multiple configurations for a vehicle compartment, including
   (a) a lower floor member;
   (b) an upper floor member;
   (c) a plurality of telescoping divider panels insertable intermediate said lower and upper floor members in spaced apart relationship and including a plurality of equally spaced apertures formed therethrough;
   (d) a plurality of fasteners insertable through said apertures to secure said divider panels to said upper and lower floor members;
   (e) a plurality of telescoping spacer panels mountable on said upper floor member in spaced apart relationship and each having a front end and a back end;
   (f) a plurality of telescoping containment panels mounted on said upper floor member in spaced apart relationship, at least one of said containment panels being mounted at said front ends of at least a pair of said spacer panels and at least another of said containment panels being mounted at said back ends of at least a pair of said spacer panels.

2. A method of installing a multi-story storage compartment in a passenger compartment of a vehicle, said passenger compartment including at least first and second seats, said method including the steps of
   (a) removing at least said first seat from the passenger compartment; and,
   (b) installing the multi-story storage compartment in the passenger compartment such that at least a portion of the storage compartment extends into the area occupied by said first seat prior to removal of said first seat from the passenger compartment.

3. A multi-level storage unit in multiple configurations for a vehicle compartment, including
   (a) a lower floor member;
   (b) an upper floor member;
   (c) a plurality of telescoping divider panels intermediate said lower and upper floor members in spaced apart relationship and including a plurality of equally spaced apertures formed therethrough;
   (d) a plurality of fasteners each inserted through one of said apertures into one of said upper and lower floor members to secure said divider panels to said upper and lower floor members;
   (e) a plurality of telescoping spacer panels mounted on said upper floor member in spaced apart relationship and each having a front end and a back end and including a plurality of equally spaced apertures formed therethrough;
   (f) a plurality of fasteners each inserted through one of said apertures in said spacer panels into said upper floor member to secure said spaced panels to said upper floor member;
   (g) a plurality of telescoping containment panels mounted on said upper floor member in spaced apart relationship, at least one of said containment panels being mounted at said front ends of at least a pair of said spacer panel and at least another of said containment panels being mounted at said back ends of at least a pair of said spacer panels, each of said containment panels including a plurality of equally spaced apertures formed therethrough; and,
   h) a plurality of fasteners each inserted through one of said apertures in said containment panels into said upper floor member to secure said spacer panels to said upper floor member.

4. A method for constructing a multi-story storage unit, comprising the steps of
   (a) providing a lower floor member;
   (b) providing an upper floor member;
   (c) mounting a plurality of telescoping divider panels intermediate said lower and upper floor members in spaced apart relationship;
   (d) mounting at least first and second telescoping spacer panels on said upper floor member in spaced apart relationship, each of said spacer panels having
      (i) a front end with a tab, and
      (ii) a back end with a tab;
   (e) mounting a first telescoping containment panel on said upper floor member, said containment panel including a first end with a tab and a second end with a tab, said first end being adjacent said front end of said first spacer panel, said second end being adjacent said front end of said second spacer panel; and,
   (f) mounting a second telescoping containment panel on said upper floor member, said second containment panel including a primary end with a tab and a secondary end with a tab, said primary end being adjacent said back end of said first spacer panel, said secondary end being adjacent said back end of said second spacer panel.

5. A storage unit assemblable in multiple configurations for a vehicle compartment, including
   (a) a lower floor member;
   (b) a plurality of telescoping first panels on said lower floor member in spaced apart relationship and including a plurality of equally spaced apertures formed therethrough, each of said panels including a front end and a back end;
   (c) a plurality of fasteners each inserted through one of said apertures into said lower floor member to secure said first panels to said lower floor member;
   (d) a plurality of telescoping second panels mounted on said lower floor member in spaced apart relationship, at least one of said second panels being mounted at said front ends of at least a pair of said first panels and at least another of said second panels being mounted at said back ends of at least a pair of said first panels, each of said second panels including a plurality of equally spaced apertures formed therethrough; and,
   (e) a plurality of fasteners each inserted through one of said apertures in said second panels into said lower floor member to secure said second panels to said lower floor member.

* * * * *